United States Patent [19]

Shiota et al.

[11] Patent Number: 4,736,244
[45] Date of Patent: Apr. 5, 1988

[54] COLOR FILM INSPECTION SYSTEM AND DATA OUTPUT METHOD THEREFOR

[75] Inventors: Kazuo Shiota; Hitoshi Urabe, both of Kanagawa, Japan

[73] Assignee: Fuji Photo Film Co., Ltd., Kanagawa, Japan

[21] Appl. No.: 63,222

[22] Filed: Jun. 18, 1987

Related U.S. Application Data

[63] Continuation-in-part of Ser. No. 805,606, Dec. 6, 1985, abandoned.

[30] Foreign Application Priority Data

Dec. 12, 1984 [JP] Japan .................................. 59-261973
Dec. 12, 1984 [JP] Japan .................................. 59-261977

[51] Int. Cl.$^4$ .............................................. H04N 1/46
[52] U.S. Cl. .......................................... 358/76; 358/80
[58] Field of Search ...................... 358/76, 78, 75, 80

[56] References Cited

U.S. PATENT DOCUMENTS

| 4,250,522 | 2/1981 | Seki | 358/76 |
| 4,364,084 | 12/1982 | Akimoto | 358/76 |
| 4,531,150 | 7/1985 | Amano | 358/76 |
| 4,536,848 | 8/1985 | d'Entremont | 358/78 |
| 4,583,186 | 4/1986 | Davis | 358/76 |
| 4,692,797 | 9/1987 | Matsumoto | 358/76 |

Primary Examiner—Howard W. Britton
Attorney, Agent, or Firm—Wenderoth, Lind & Ponack

[57] ABSTRACT

The conventional color film inspection system requires an FSS or photo-multipliers, which tends to make the system complicated and costly. Unless the displayed imaged on a monitor display and the actually printed picture are accurately matched, even if the displayed images are correct, the printed images are not always satisfactory. This invention can offer a color film inspection system which is low in price, excellent in S/N ratio, simple in construction and yet excellent in precision.

18 Claims, 8 Drawing Sheets

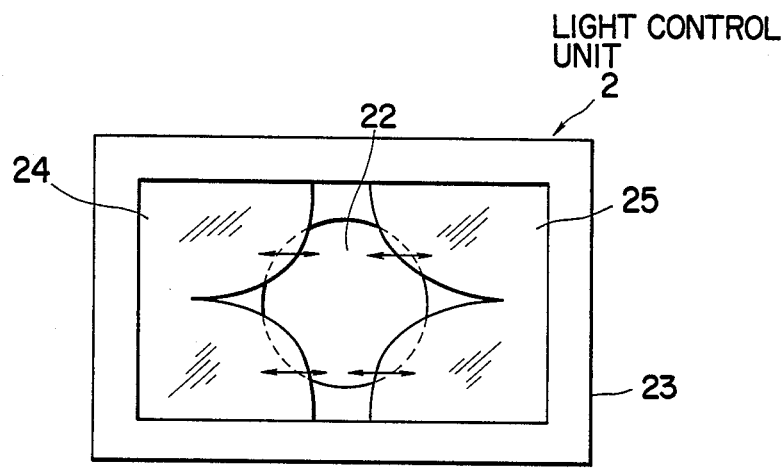
F I G. 7A
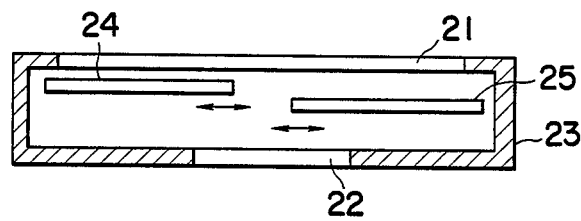
F I G. 7B
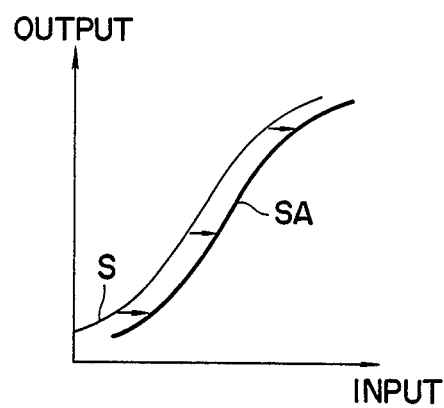
F I G. 8

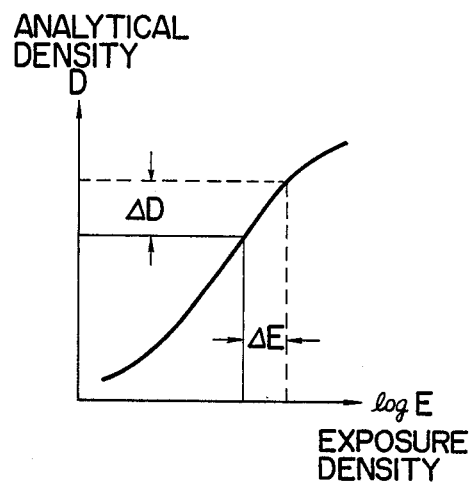
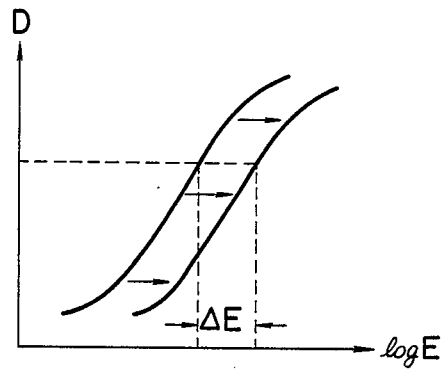
FIG. 10   FIG. 11
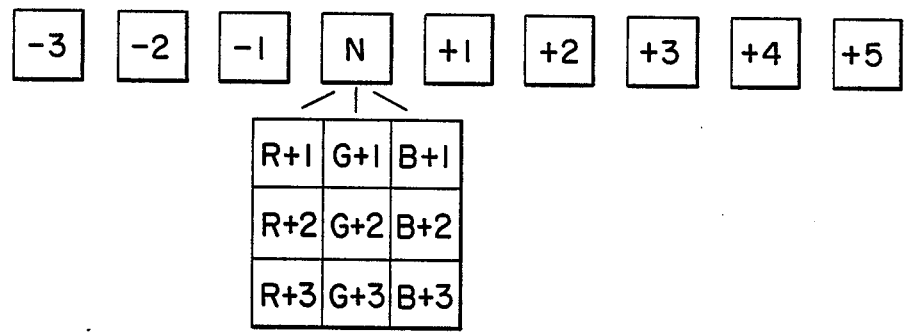
FIG. 12

COLOR FILM INSPECTION SYSTEM AND DATA OUTPUT METHOD THEREFOR

CROSS-REFERENCE TO RELATED APPLICATION

This application is a continuation-in-part of our prior application Ser. No. 805,606, filed on Dec. 6, 1985, entitled "COLOR FILM INSPECTION SYSTEM AND DATA OUTPUT METHOD THEREFOR", and now abandoned.

BACKGROUND OF THE INVENTION

This invention relates to a color film inspection system for evaluating color original images before printing process and its data output method, and more particularly to a color film inspection system which converts the color and density of a film into video signals in order to evaluate a film and determine printing condition thereof and displays them on a color monitor for evaluating the color original images before printing process and the data output method therefor.

One of the conventional art color film inspection systems is disclosed in "An Instantaneous Electronic Color-Film Analyzer" (Journal of the SMPTE, 67 pp 17-26, 1958). The disclosed structure is shown in FIG. 1 wherein a negative film 31 is illuminated with a flying spot scanner (FSS) 30, and images on the negative film 31 are color-separated via dichroic mirrors DC1 and DC2 and detected by photosensors 32R, 32G and 32B of three primary colors R (red), G (green) and B (blue). The signals detected by the photosensors 32R, 32G and 32B are respectively amplified and adjusted in gain by amplifiers 33R, 33G and 33B, inputted to a gradation correction circuit 34, and then to a matrix circuit 35 for correcting undesirable pigment absorption, and sent through an exponential amplifier 36 to display the picture images of the negative film 31 on a color monitor 37. Another inspection system is proposed in "SMPTE Journal, March 1983, pp 303-307". In the inspection system shown in FIG. 2, a negative film 41 is illuminated similarily with an FSS 40 and image signals detected by photo-multipliers 42R, 42G and 42B are converted at a logarithmic converting circuit 44 via amplifier 43 into density signals, inputted to a color 48 via a masking matrix 45, a γ-amplifier 46, and an exponential amplifier 47 and the picture images of the negative film 41 are displayed on a color monitor 48. In this case, the masking matrix 45 corrects the differences in detected density of the negative film due to differences between the spectral characteristics of the photographic material and that of the inspection system.

In the conventional art systems as shown in FIGS. 1 and 2, asince colors are matched by adjusting gains at amplifiers of three colors for each color, the S/N (signal/noise) ratio tends to be deteriorated as the density of the negative film increases. Unless computation of masking matrix is remade, the correction in gain by the amplifiers cannot accurately to converted to exposure on a color paper (photographic paper) or a color positive film. This is not taken into account in the prior art systems due to complexity.

Moreover, since the price of a TV (television) camera has been cut down significantly in recent years, it is noted that the combination of a white light source and a TV camera becomes cheaper than that of a flying spot scanner and photo-multipliers.

The film inspection method by the conventional systems is conducted in the procedure as shown in FIG. 3. A film with original images to be printed, for instance a negative film 100 is illuminated with light from a light source 101 and the whole images are picked up by an image pickup device such as a TV camera 102 and inputted into an image processing circuit 110. The image processing circuit 110 includes a color correction circuit, a gradation conversion table and a negative/positive converter, so that it conducts necessary processing on the video signals from the TV camera 102 to display images of the negative film 100 on a display unit 115 such as CRT via a display control circuit 113. An operator watches the images displayed on the display unit 115 and if he judges the color balance or the density unsatisfactory, corrects the images by manipulating a keyboard 114. The analyzed data of the image processing is printed out on a paper by a data output device 111 or outputted to a magnetic tape or a floppy disc. The negative film 100 which has been inspected and corrected in this way is sent to a photographic color printer 120 together with the data recorded on a recording medium 112 by the data output device 111 and the color printer 120 prints the images on a color paper to provide a photograph 121.

In the above described prior art systems, the negative film 100 on the display unit 115 is inspected by an operator, but the images on the resultant photograph 121 is printed by the photographic color printer 120 on the color paper. Unless the images displayed on the display unit 115 in the inspection system is accurately corresponded to the photograph 121 printed by the photographic color printer 120, the photograph 121 printed by the photographic color printer 120 is not necessarily optimum even if the images are correctly displayed and corrected optimally at the display unit 115. This presents a difficulty.

When an exposure density is converted into an exposure time for each of RGB colors of the photographic color printer 120, if color the printer 120 is of cut-filter type having a leak characteristic, the exposure time of RGB will not be proportional to the exposure density as it is. Moreover, the exposure density electrically obtained does not correspond to the printing density as it does not take into account the reciprocity law failure. This leads to a problem in finished gradation such as slope characteristic as they are not fully inspected on a display unit. Further, this method allows difference caused by the preference particular to a laboratory.

SUMMARY OF THE INVENTION

This invention was contrived in order to obviate the defects mentioned above, and aims at providing a color film inspection system which is low in price, excellent in S/N ratio, simple in construction and yet high in precision.

Another object of this invention is to provide a data conversion and output method which well matches the images displayed in the inspection system with the images actually printed.

According to one aspect of this invention, for achieving the objects described above, there is provided a color film inspection system comprising an image pickup device which picks up color original images to be inspected, an input light amount control device which controls the amount of input light to said image pickup device for said color original images, a converting means which converts video signals from said image pickup device into digital values and then into density signals, a color correction circuit which corrects in color the output from said converting means, a gradation converting means which independently converts in gradation the primary color signals from said color circuit, and a color monitor means which converts the outputs of said gradation converting means into analog values and displays the same, whereby the luminance of the images displayed on said color monitor means is adjusted by the amount of input light, and the color balance is adjusted by the shift of a data table of said gradation converting means, said adjustments being conducted independently of and separately from each other.

According to another aspect of this invention, there is provided a color film inspection system comprising a TV camera which picks up images of color original images to be inspected, a light control unit which controls the amount of light emitted from a light source upon the color original images for said TV camera, a logarithmic converting circuit which converts video signals from said TV camera into digital values and then into density signals, a color correction circuit which corrects in color said density signals, a look-up table which independently converts in gradation three primary color signals from said color correction circuit, a color monitor means which converts the output from said look-up table into analog values and displays the same, and a controlling means which controls the amount of light at said light source, the aperture of said light control unit, the magnification of said TV camera, said logarithmic converting circuit, said color correction circuit and said look-up table respectively.

Further, according to still another aspect of this invention, there is provided a data output method for a color film inspection system which displays color film original images on a display unit of the film inspection data of said color film original images into exposure of the three colors of RGB of a photographic color printer and outputs the same, which is characterized in that the method comprises the steps of obtaining theamount as said inspection data which does not depend on the photographic color printer, and correcting the filtering amount of said photographic color printer which can be induced there with the transmittance of a filter which is sensed by each color sensitive layer of a color paper for printing so that said inspected film original images are printed optimally by said photographic color printer.

Still further, according to another aspect this invention, there is provided a data output method for a color film inspection system which displays color film original images on a display unit, evaluates and inspects the displayed images, converts inspected data of said color film original images into exposure amount of three colors of RGB of a photographic color printer and outputs the same, which comprises the steps of obtaining a value as said inspected data which does not depend on a photographic color printer, correcting filtering amount of said photographic color printer which is predetermined by said value with transmission factor of a filter sensed by each color sensitive layer of a color paper to be printed, and correcting color slope characteristics of the color film inspection system as well as sensitivity due to reciprocity law failure on said color paper in correspondence to the degree of standard, over- or under-exposure of said color film original images; thereby to optimally print said inspected film original images by said photographic color printer.

The nature, principle and utility of the invention will become more apparent from the following detailed description when read in conjuction with the accompanying drawings.

BRIEF DESCRIPTION OF THE DRAWINGS

In the accompanying drawings:

FIG. 7A is a plane view to show an embodiment of a light control unit;

FIG. 7B is a sectional side view thereof;

FIG. 8 is a graph to show an example of characteristics of a gradation conversion table;

FIGS. 10 through 12 are views to explain the data output method according to this invention.

DESCRIPTION OF THE PREFERRED EMBODIMENTS

Figure 1:
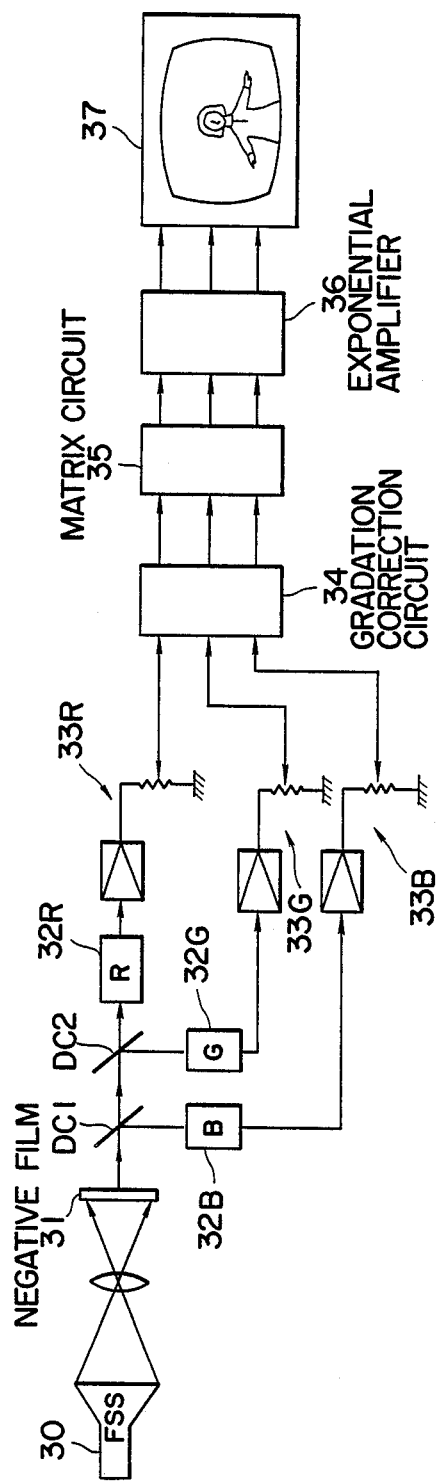
FIGS. 1 and 2 are structural views respectively to show conventional color film inspection systems.
Figure 2:
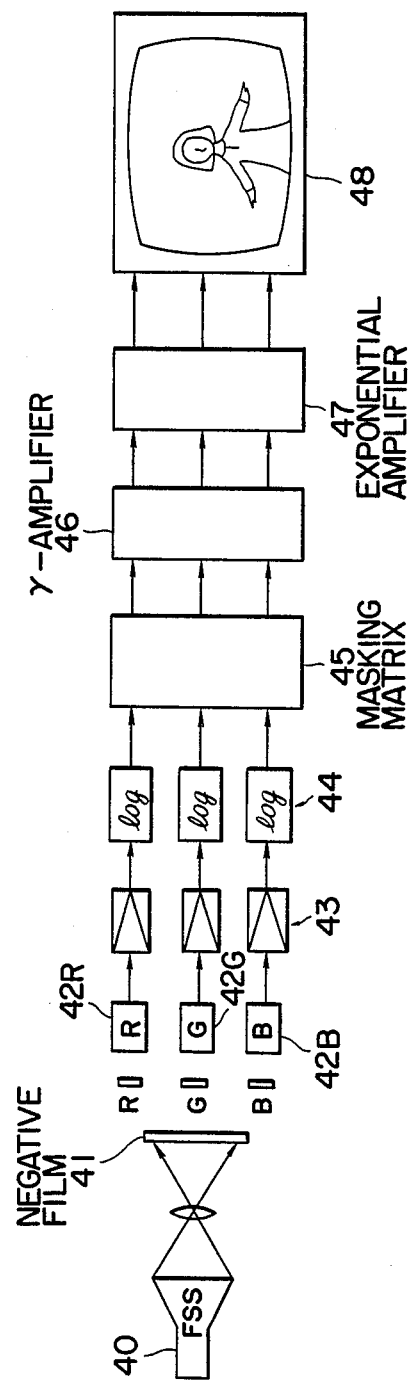
Figure 3:
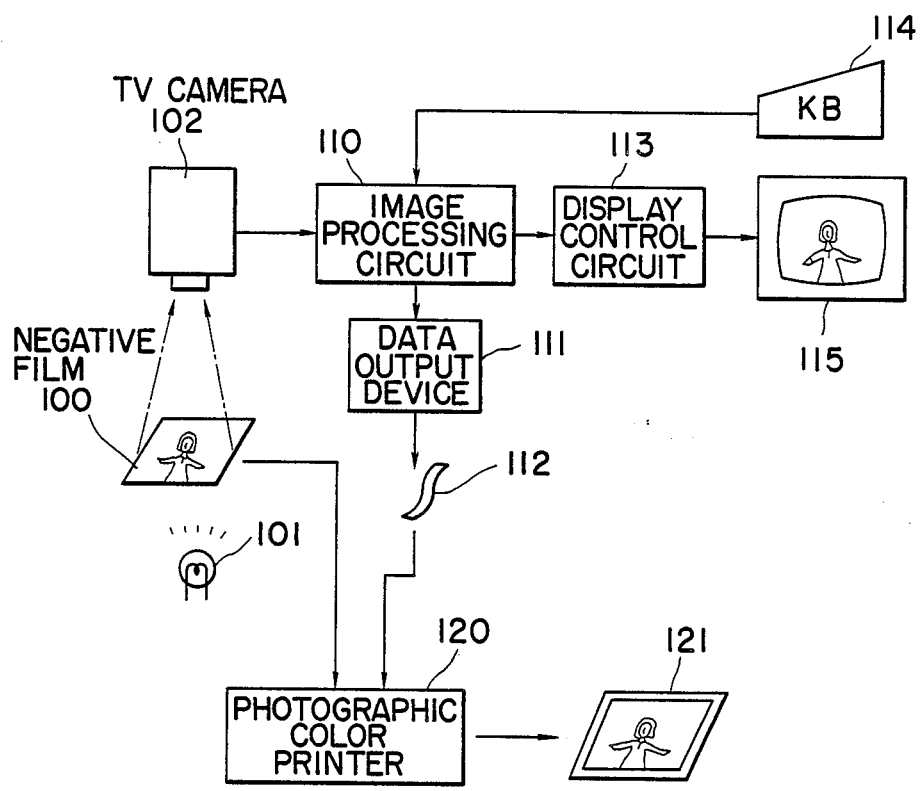
FIG. 3 is an explanatory view of a film inspection procedure in a conventional color film inspection system.
Figure 4:
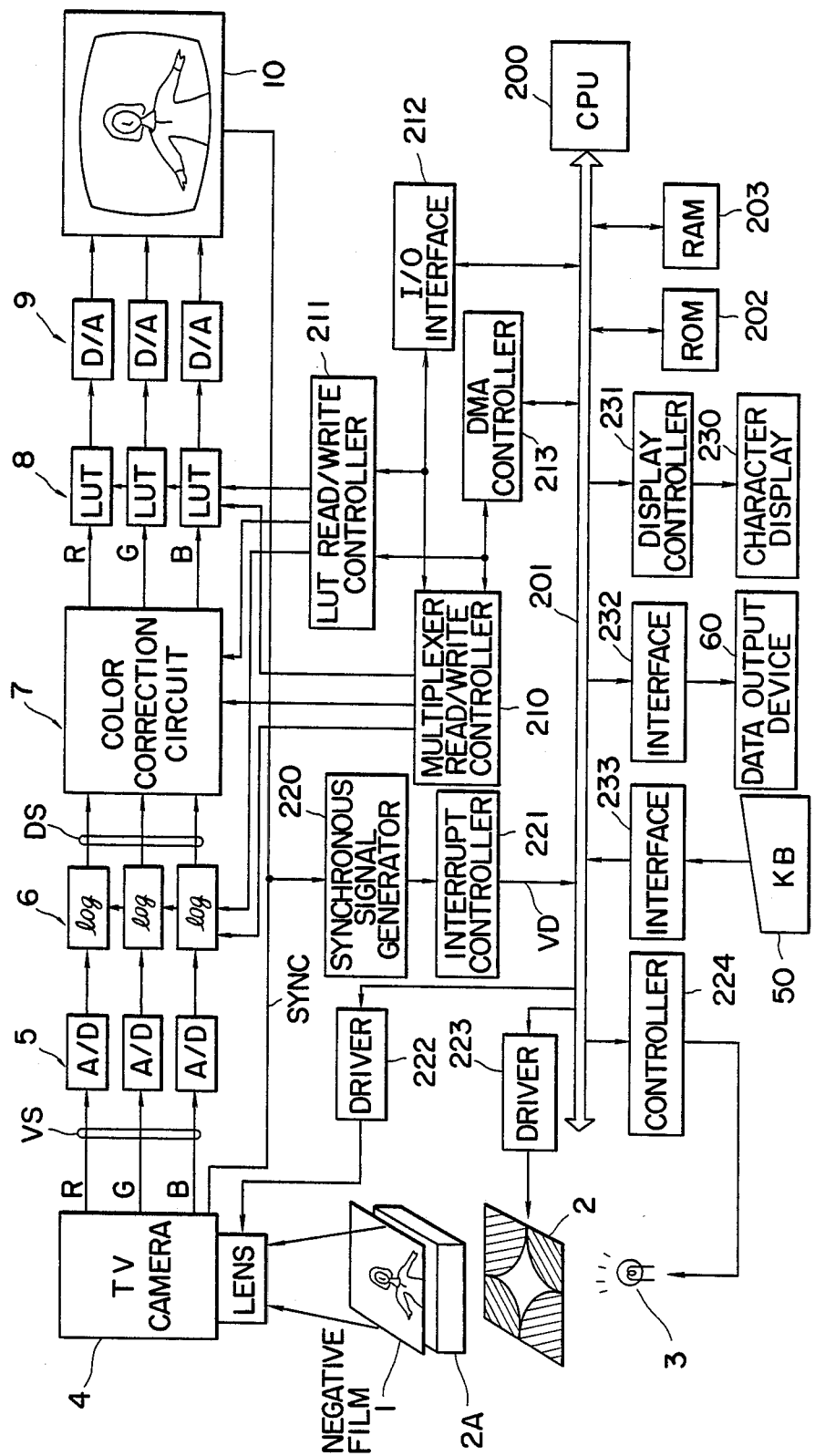
FIG. 4 is a block diagram to show an embodiment of this invention.
Figure 5:
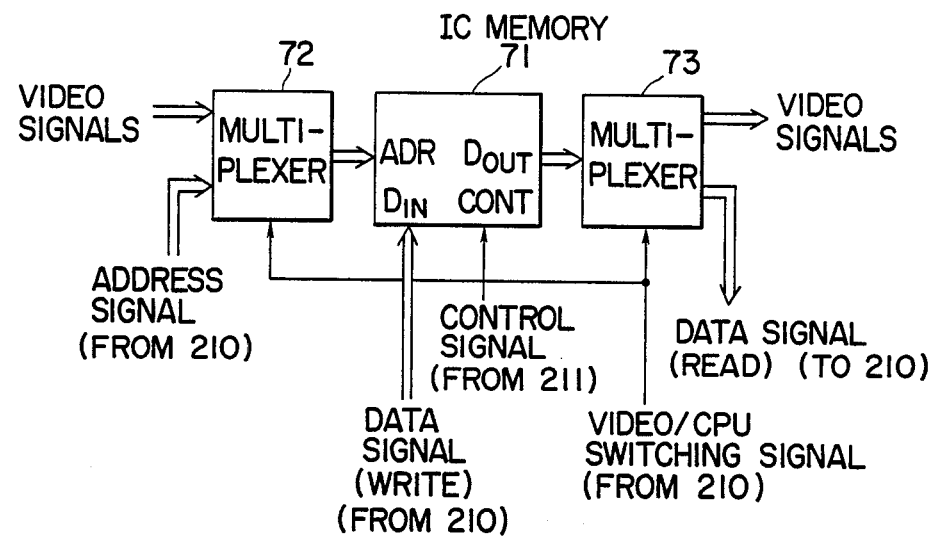
FIG. 5 is a detail block diagram showing a color correction circuit, logarithmic converting circuits and look-up tables in FIG. 4.
Figure 6:
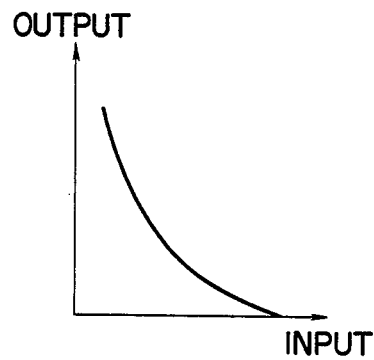
FIG. 6 is a graph to show an example of output characteristic of logarithmic conversion.

FIG. 4 shows an embodiment of this invention wherein a negative film 1 which is a color original picture is exposed to light from a light source 3 via a light control unit 2 and a mirror box 2A and the whole images thereof are picked up by a TV camera 4 or an image pickup device. The video signals VS in three primary colors RGB from the TV camera 4 are converted into digital values by A/D (analog-to-digital) converters 5, inputted into logarithmic converting circuits 6 each comprising a look-up table for logarithmic conversion with the functions shown in FIG. 6 and converted into density signals DS. The density signals DS thus obtained by the logarithmic converting circuits 6 are inputted respectively to a color correction circuit 7 to correct for the difference in spectrum characteristics between the TV camera 4 and a color paper according to a predetermined operation formula. This makes the output from the color correction circuit 7 proportional to the density of the negative film 1 sensed on the color paper. Thus corrected signals are inputted to look-up tables 8 in order to display them on a color monitor 10 in accordance with the gradation characteristics of the color paper, converted into analog values by D/A (digital-to-analog) converters 9, and inputted to a color monitor 10 such as a CRT to display the images of the negative film 1. All of the color correction circuit 7, the logarithmic converting circuits 6 and the look-up tables 8 comprise of an IC memory 71 and two multiplexers 72 and 73 as shown in FIG. 5, respectively. In other words, the logarithmic converting circuits 6, the color correction circuit 7 and the look-up tables 8 have the same construction. The multiplexers 72 and 73 are operatively switched by a video/CPU switching signal transmitted from a multiplexer read/write controller 210. If the multiplexers 72 and 73 are respectively switched from CPU-side to video-side, the multiplexer 72 inputs video signals transmitted from a former stage and the multiplexer 73 outputs the video signals, and if the multiplexers 72 and 73 are respectively switched from the video-side to the CPU-side, the multiplexer 72 inputs an address signal transmitted from the CPU 200 and the multiplexer 73 outputs data signal read in the IC memory 71.

The CPU 200 controls the whole system and has a CPU bus-line 201 which is operatively connected to a ROM (Read Only Memory) 202 and a RAM (Random Access Memory) 203. The logarithmic converting circuits 6, the color correction circuit 7 and the look-up table 8 are controlled by the look-up table read/write controller 211 and the multiplexer read/write controller 210 as described above, and the multiplexer read/write controller 210 and the look-up read/write controller 211 are operatively connected to the CPU 200 via DMA (Direction Memory Access) controller 213 and an input/output interface 212. The TV camera 4 and the color monitor 10 are synchronous with a horizontal synchronous signal SYNC each other, the horizontal synchronous signal SYNC is inputted to a synchronous signal generator 220 and a vertical synchronous signal VD thus obtained is inputted to the CPU 200 via an interrupt controller 221. Further, the CPU 200 is connected to a keyboard 50 which is manipulated by an operator via an interface 233, is connected to a data output device 60 for recording the inspection result of the negative film 1 on a magnetic tape or a floppy disc via an interface 232, and further is connected to a character display 230 through a display controller 231. The CPU 200 controls a magnification of the TV camera 4 via a driver 222, an aperture of the light control unit 2 via a driver 223 and light amount of the light source 3 via controller 224.

The light control unit 2 as shown in FIGS. 7A and 7B comprises a box-like frame 23 including a rectangular aperture 21 at the top and a circular optical path hole 22 at the bottom. A pair of metal plates 24 and 25 are arranged inside the frame 23 in staggered positions as if to encircle the optical path hole 22 therebetween. The plates 24 and 25 are moved interlocking by the driver 223 in the direction marked with arrows. The aperture amount of the light control unit 2 is operatively controlled by the displacement of the metal plates 24 and 25 so as to adjust only the amount of light passing therethrough. Color is not changed by amount of the aperture 22. Gradation conversion tables for each color are set in the look-up tables 8. For instance, a data table shown with the letter S in FIG. 8 is set.

Figure 9A:
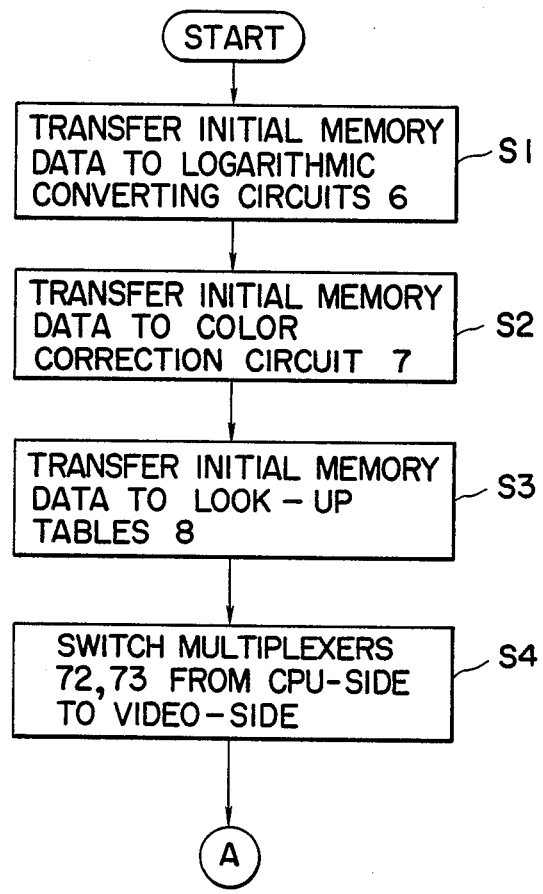
FIGS. 9A and 9B are flow charts showing an operation of a CPU in FIGS. 4 and 5.
Figure 9B:
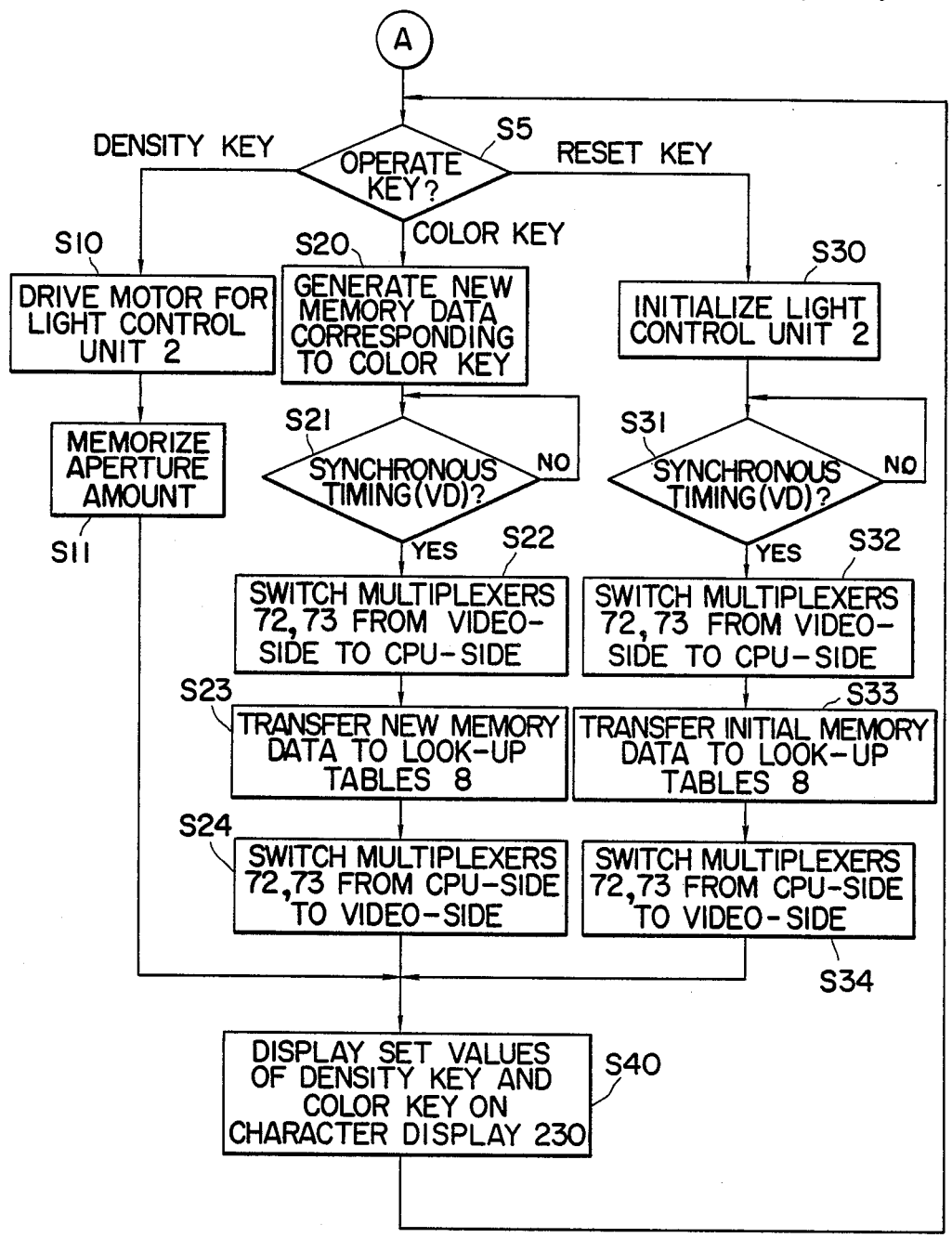

In the system with the above described construction, the operation will now be described in more detail with reference to flow charts in FIGS. 9A and 9B.

When power of the system is turned on, predetermined first initial data is transferred to the logarithmic converting circuits 6 via the look-up table read/write controller 211 and the multiplexer read/write controller 210 and then set therein (Step S1), predetermined second initial memory data is transferred to the IC memory 71 in the color correction circuit 7 via the multiplexer read/write controller 210 and the look-up table read/write controller 211 and then set therein (Step S2) and predetermined third initial memory data is transferred to the look-up tables 8 via the look-up table read/write controller 211 and the controller 210 and then set therein (Step S3). The respective multiplexers 72 and 73 are switched to the CPU-side at the above setting operation, therefore the CPU 200 is able to directly access the IC memory 71 via the DMA controller 213 and to transfer the initial memory data in advance stored in the RAM 203 to the logarithmic converting circuits 6, the IC memory 71 and the look-up tables 8. Then, the multiplexers 72 and 73 are respectively switched from the CPU-side to the video-side by the video/CPU switching signal (Step S4) so that images picked-up by the TV camera 4 should be displayed on the color monitor 10.

The negative film 1 is exposed with the predetermined amount of light from the light source 3 which is controlled by the controller 224, and the images are picked-up by the TV camera 4 to be converted into digital values by the A/D converters 5. They are color-compensated with the density signals DS which have been converted by the logarithmic converting circuits 6, converted in gradation by the look-up tables 8 and displayed at the color monitor 10 in positive images. The CPU 200 controls the light source 3 via the controller 224 so that it will emit a predetermined amount of light. The luminance of the color monitor 10 is adjusted by controlling the aperture of the light control unit 2 via the driver 223. More specifically, the light path may be narrowed by moving the metal plates 24 and 25 respectively in the direction toward center of the path by the control of the driver 223 so that the amount of light emitted from the light source 3 onto the negative film 1 is reduced to enhance the luminance of the images displayed on the color monitor 10. Conversely, by moving the metal plates 24 and 25 outward respectively to enlarge the aperture, the light path is expanded so that the amount of light illuminating from the light source 3 onto the negative film 1 increases to lower the luminance of the images displayed on the color monitor 10. Since the amount of light transmitted through the negative film 1 via the aperture of the light control unit 2 is varried constantly for all wavelength of the light, and it is varied for three primary colors at the same ratio. This is avantageous in color compensation of each color in the color correction circuit 7 as the variation of the color R would not influence compensation of other colors such as G and B and the displayed images can be controlled as a whole with luminance alone. The images displayed on the color monitor 10 become bright or dark in correspondence to over- or under-exposure of the negative film 1. The operator operates the keyboard 50 (Step S5) so that the images displayed on the color monitor 10 become suitable color and density.

The above arrangement allows the operator to control the light control unit 2 by manipulating the keyboard 50 via the CPU 200 and the driver 223 to have the optimum luminance when the judges the luminance of the images displayed on the color monitor 10 insufficient or excessive (Step S10). According to this invention, the change in density which entails over- or underexposure of the negative film 1 may be dealt with simply by controlling a light source means without deteriorating the S/N ratio. The aperture amount of the light control unit 2 corresponding to the moving amount by the driver 223 is memorized in the RAM via the CPU 200 (Step S11).

If the color balance of the images displayed on the color monitor 10 is not satisfactory, the operator manipulates a color key on the keyboard 50 (Step S5) thereby to generate new memory data in the RAM via the CPU 200 corresponding to the value of the manipulated color key (Step S29). Then, the CPU 200 inputs a vertical synchronous signal VD at a synchronous timing via the synchronous signal generator 220 and the interrupt controller 221 (Step S21) and switches the multiplexers 72 and 73 from the video-side to the CPU-side via the mutiplexer read/write controller 210 and the controller 211 (Step S22). Next, the CPU 200 transfers the data set in the RAM 203 at the above step S20 to the look-up tables 8, up-dates the table data (Step S23) and then switches the multiplexers 72 and 73 from the CPU-side to the video-side (Step S24). In other words, the hue of the output images which are synthesized can be arbitrarily adjusted by shifting in parallel data tables of respective colors in the look-up tables 8 by means of the operation of the keyboard 50 via the CPU 200 as shown in FIG. 8 with the letter SA. As described above, since the inputs at the look-up tables 8 are the signals proportional to the density of the negative film 1 which is sensed by each color sensitive layer of the color paper, density data can be varied for each color independently simply by shifting in parallel the data on the look-up tables 8. Therefore, images with described color balance can easily be obtained on the color monitor 10 by adjusting the color variations in suitable combination. This means the data can be varied without the need of computing functions anew for look-up tables. The colors can be modified simply as soon as the operator manipulates the keyboard 50. In this invention, the color balance which is often disturbed by fluctuation in color temperature at a light source when the images are picked-up is corrected by shifting the conversion tables in parallel after color compensation and logarithmic conversion. Because such modification is done only after logarithmic conversion, parallel shift of the data tables is possible to thereby increase the speed in operation.

The amount of adjustment in density data by means of the light control unit 2 and the amount of displacement of the gradation conversion data in the look-up tables 8 are expressed in terms of exposure amount (exposure density) sensed by each layer of the color paper and hence, such operation can be handled independently of the characteristics of the photographic color printer. The exposure density is controlled by the CPU 200 incorporated with the ROM 202 and the RAM 203 so that when the negative film 1 is to be printed by a photographic color printer after the present inspection has been completed, printing operation can be optimally and simply conducted by the steps of outputting the data to a data output device 60 via the interface 252 to record the same on a floppy disc or similar recording medium, transferring the recorded data into the color printer, and doing conversions suitable for a particular printer. The values set by the density key and the color key on the keyboard 50 are displayed on the character display 230 via the display controller 231 (Step S40).

It the operator manipulates a reset key on the keyboard 50 at the above step S5, the CPU 200 returns the light control unit 2 to the initial state (Step S30). The CPU 200 detects a synchronous timing (Step S31) and then switches multiplexers 72 and 73 from the video-side to the CPU-side (Step S32) thereby to transfer the initial memory data to the look-up tables 8 and set therein (Step S33). Thereafter, the CPU 200 switches the multiplexers 72 and 73 from the CPU-side to the video-side (Step S34).

Although the light control unit 2 is used as a density adjustment device in the above described embodiment, any device may be used so long as it can adjust the amount of light over the whole images inputted to the TV camera 4, and further adjustment may be done by placing an aperture control mechanism often used in a camera or continuous wedges in front of the TV camera 4.

As described in the foregoing, according to this invention color film inspection system, the density correction of the color images is conducted by a light amount control means which changes the density for the three primary colors in the same ratio, while the color balance is corrected by shifting in parallel the data in the gradation conversion table for each of the RGB colors. Therefore, even if a color is adjusted, the other colors are not influenced by the adjustment or correction and each of the colors can be adjusted separately and independently. This feature is a tremendous advance in realizing effective operation in inspection of color films. This system not only improves the S/N ratio but also enables to acquire corrected data corresponding to the negative density sensed on the color paper by simple operation so as to change color instantaneously.

According to this invention, the result of the inspection is modified by taking into consideration such factors as the leak from the cut filters used in the photographic color printer, the reciprocity law failure of the color paper, the difference in gradation between the color paper and CRT, and the individual preference of a laboratory. The coefficients needed for such modification are as follows; the leak from the three color cut filters is expressed in terms of transmittance sensed by layers of a color paper, which is a value inherent to a photographic color printer. Table 1 shows the leakage coefficients of CMY cut filters corresponding to the three colors of RGB of a color paper.

TABLE 1

| Cut Filter | Color Paper | | |
|---|---|---|---|
| | R | G | B |
| C | $T_{CR}$ | $T_{CG}$ | $T_{CB}$ |
| M | $T_{MR}$ | $T_{MG}$ | $T_{MB}$ |
| Y | $T_{YR}$ | $T_{YG}$ | $T_{YB}$ |

The coefficients for correcting the sensitivity of the color paper due to the reciprocity law failure are the functions of the exposure log E. A pair of values of each $S_{OR}$, $S_{OG}$, $S_{OB}$, $S_{UR}$, $S_{UG}$ and $S_{UB}$ is determined by whether it is over-exposure or under-exposure. The relation holds as $$\log (\text{corrected exposure density}) = S_{ij} \times \text{exposure density} \qquad (1)$$

The slope characteristics is to correct the exposure or color balance of a color paper to optimum conditions and is a coefficient multiplicand as follows:

$$\begin{bmatrix} U_{ORR} & U_{ORG} & U_{ORB} \\ U_{OGR} & U_{OGG} & U_{OGB} \\ U_{OBR} & U_{OBG} & U_{OBB} \end{bmatrix}, \begin{bmatrix} U_{URR} & U_{URG} & U_{URB} \\ U_{UGR} & U_{UGG} & U_{UGB} \\ U_{UBR} & U_{URR} & U_{UBB} \end{bmatrix}$$

The individual preference of laboratories is corrected by micro-adjustment in the three color density balance or more specifically by adding/subtracting exposure density with or by offset values $C_R$, $C_G$ and $D_B$.

The operational principle for printing exposure time will now be explained.

The exposure densities for a standard negative film are represented as log $E_{OR}$, log $E_{OG}$ and log $E_{OB}$, and the printing time for the standard negative film as $t_{OR}$, $t_{OG}$ and $t_{OB}$. They are predetermined and present conditions. The exposure densities for a negative film to be inspected are represented as log $E_R$, log $E_G$ and log $E_B$ which are the values measured by the inspection system, and the actual printing times for the negative film as $t_R$, $t_G$ and $t_B$. By using the formulas (2) and (3) below, correction for the reciprocity law failure, slope correction and individual preference correction are conducted. Here is shown an example of an over-exposed negative film (0).

$$\begin{bmatrix} \log E_R' \\ \log E_G' \\ \log E_B' \end{bmatrix} = \underbrace{\begin{bmatrix} U_{ORR} & U_{ORG} & U_{ORB} \\ U_{OGR} & U_{OGG} & U_{OGB} \\ U_{OBR} & U_{OBG} & U_{OBB} \end{bmatrix}}_{\text{slope matrix}} \times \underbrace{\begin{bmatrix} S_{OR} & 0 & 0 \\ 0 & S_{OG} & 0 \\ 0 & 0 & S_{OB} \end{bmatrix}}_{\text{reciprocity law failure}} \times \begin{bmatrix} \log (E_R/E_{OR}) \\ \log (E_G/E_{OG}) \\ \log (E_B/E_{OB}) \end{bmatrix} \quad (2)$$

$$\begin{bmatrix} \log E_R'' \\ \log E_G'' \\ \log E_B'' \end{bmatrix} = \begin{bmatrix} \log E_R' \\ \log E_G' \\ \log E_B' \end{bmatrix} + \underbrace{\begin{bmatrix} C_R \\ C_G \\ C_B \end{bmatrix}}_{\substack{\text{individual} \\ \text{preference} \\ \text{of laboratories}}} \quad (3)$$

Whether to use over-type or under-type is determined depending on positive/negative of log $(E_R/E_{OG})$+log $(E_G/E_{OG})$+log $(E_B/E_{OB})$.

Then, the timing of the cut filters is obtained by the below procedures <A> through <E>. (where i: R, G, B)

<A> From log $E_i''$ a cut filter of ideal characteristics is assumed and an exposure time $t_i'$ is computed.

$$t_i' = t_{oi} \times 10^{\log E_i''} \quad (4)$$

<B> Based upon the exposure times $t_R'$, $t_G'$ and $t_B'$, obtained from the above step <A>, the exposure density log $E_i$ if the transmittance of the cut filter is taken into account, is computed by the formula below. Provided, it is assumed herein the relation is $t_R' < t_G' < t_B'$ and $t_{OR} < t_{OG} < t_{OB}$.

$$\log E_i'''/E_{oi} = \log \frac{I_o \{t_R + T_{ci} \times (t_G - t_R) + T_{ci} \times T_{Mi}(t_B - t_G)\}}{I_o \{t_{OR} + T_{ci} \times (t_{OG} - t_{OR}) + T_{ci} \times T_{Mi}(t_{OB} - t_{OG})\}} \quad (5)$$

<C> Examination is made to know whether or not the condition below is satisfied by all of the tree colors.

$$|\log (E_i'''/E_{oi}) - \log E_i''| < \Delta D \quad (6)$$

<D> If the condition of the above <C> is met in all of the three colors, operation proceeds to the next step <E>. If not, exposure time $t_R''$, $t_G''$, $t_B''$ are obtained from the next formula (7) and the operation will return to the step <B> above. But replace $t_i'$ in <B> with $t_i''$.

$$t_i'' = t_i' \times 10^{(\log E_i'''/E_{oi} - \log E_i)} \quad (7)$$

<E> The exposure times $t_R'$, $t_G'$ and $t_B'$ thus obtained are used as the timing $t_R$, $t_G$ and $t_B$ for the cut filter. Provided the precision in computation is determined by $\Delta D$ and if $\Delta D = 0.01$, the deviation in color balance is less than 0.01 in terms of the negative density.

Such coefficients as operational coefficients in $3 \times 3$ matrix which modifies the spectral characteristic of a color paper or that of output look-up table to determine gradation in CRT display are used in setting printing conditions in addition to those mentioned above. Another coefficient needed is the coefficient needed is the coefficient for the integral density of printing which is a value measurable at the time of setting conditions into analytic density. These coefficients can be obtained in the following steps.

(1) Determination of Transmission Coefficient of a Cut Filter in a Printer

The transmission coefficient of a cut filter can be obtained by placing a detector having the same spectral characteristic as that of the color paper on the paper surface, which, however, is difficult in practice. Manufacturers generally obtain a typical value by measuring the spectral characteristic of a cut filter and multiplying it with the spectral sensitivity of the color paper (under the printer light source). However, as there are manufacturing fluctuation in cut filter characteristics to a significant extent, users should obtain the coefficient for each printer. The most practical method which is easily managed on the user side will be the one measuring several combinations of printing time and printing density and computing transmittance of the cut filter based on the above measured values. The principle and the procedures of this method will be described below.

As shown in FIG. 10, it is assumed that the relation between the exposure density log E and the analytical density D is known. If the characteristic of the cut filter is ideal, the exposure density log E is proportional to the exposure time, but in practice, because of a transmission coefficient the exposure density log E will vary slightly. Therefore, the transmission coefficient could conversely be obtained by measuring the deviation ($\Delta D$) in exposure density from the assumed ideal filter (broken line) and converting the deviation into an exposure density ($\Delta E$). The relation between the exposure density log E and the analytical density D could be determined in the following manner; first, printing is conducted in a manner to meet the conditions of dead-heat of three colors at various times so as to keep the quality of the light on the paper constant. This produces a print in which exposure density changes in proportion to time. Then the print is measured for density and thus obtained integral density is converted into an analytical density by the following steps 1 through 8, assuming the conversion coefficient is given.

① A negative film is prepared, which should meet dead-heat condition or finish the color gray under optical exposure and which could be stably and reproducibly measured on a specified portion with a densitometer.

② An exposure time (dead-heat time) to which makes the print densities for three colors 0.5 through 0.7 is sought.

③ The same negative film is exposed at exposure times (dead-heat times) of $0.79t_O$, $t_O$, $1.26t_O$, $1.58t_O$, $2.00t_O$ and the print densities are measured.

The precision in density measuring (reproducibility) should be kept with in ±0.01.

④ The print densities (integral densities) are converted into analytical densities and the relation between log (exposure time) and the analytical density is listed in a table in the unit of $\Delta\log$ (time)=0.005 by interpolation.

⑤ Then, the same negative film is printed at the time of $(t_R, t_G, t_B) = (1.58t_O, t_O, t_O)$, $(t_O, t_O, 1.58t_O)$ to measure the print densities. The precision in density measure is kept within ±0.01.

⑥ The print densities are converted into analytical densities and corresponding log (exposure time) is obtained by using the table obtained at the above step ④. The precisionis kept within ±0.0025.

⑦ From the relation between the time obtained in the step ⑥ and the time actually exposed in the step ⑤, the transmission coefficient of the cut filter is obtained. For instance, if the time calculated from the negative films exposed at the exposure times $(1.58t_O, t_O, t_O)$ are $t_R$, $t_G$ and $t_B$, the relation holds as below.

$$\{1+(1.58-1)T_{cj}\} \times t_o = t_i \qquad (8)$$

From the relation above, the formula below holds.

$$T_{cj} = t_i - t_o/0.58t_o \qquad (9)$$

$T_{Mi}$ and $T_{Yi}$ can be obtained in the manner similar to the above.

⑧ The precision in transmission coefficient when calculated under the above conditions may be:

| density measurement | ±0.01 |
| integral/analytical conversion | ±0.01 |
| density/exposure conversion | ±0.005 |

And the relation holds as;

$$\text{accuracy} = \sqrt{\left(\frac{0.01}{\gamma}\right)^2 \times 2 + \left(\frac{0.01}{\gamma}\right)^2 + 0.005^2}$$

where $\gamma=2$

Therefore, for the difference in density balance between three colors $\Delta D = \pm 0.2$, the deviation in color balance can be obtained at the precision of 0.01 in terms of density.

(2) The Matrix Coefficient of Reciprocity Law Failure

This coefficient is used to correct the changes in the sensitivity of a color paper due to the reciprocity law failure. It is assumed to do linear correction to density of the negative film. If the standard print time is determined, it can be obtained from the characteristic curve of the reciprocity law failure set for each color paper. The coefficient can be determined by varying the amount of light received by the color paper to measure the relation between the print time and the print density and to calculated it in a manner similar to that of above mentioned cut filter transmission coefficient.

The principle in determining coefficients lies in that as shown in FIG. 11, the curve shifts in parallel displacement as the intensity of light changes even if the product of the amount of light on the color paper and the exposure time is constant. The value of displacement is converted to the exposure density log E. It is simple to obtain the time which makes the exposure density constant under the condition that the light quality onto the color paper is kept constant. Practically, the change in light amount can be obtained in the following steps (a) through (g), using the same negative film but adding an ND (neutral density) filter;

(a) The method for over-exposed negative films is indicated. The negative film used in above ① is also used and a table showing the relative correspondence between the exposure density log E and the analytical density D is prepared.

(b) An ND filter having the transmittance of 25% or around is prepared. The transmittance of the ND filter should be known to be ±2.3% (±0.01 in density) when expressed in terms of spectral sensitivity of the color paper.

(c) The above negative film is printed at the time obtained by multiplying the reciprocal number of the transmittance of the ND filter with $t_O$ and the print density is measured.

(d) The print density is converted into an analytical density D and a corresponding exposure density log E is obtained from the table prepared in the above step (a).

(e) The difference between the exposure density obtained in the above step (d) and the exposure time calculated is divided by the density of the ND filter to obtain the coefficients A3 and B3.

If it is assumed that

| the exposure density in calculation | log $E_c$ |
| exposure density obtained at the step (d) | log $E_m$ |
| density of the ND filter | D, | the coefficients A3 and B3 can be calculated from the formula (10):

$$\text{coefficient} = (\log E_m - \log E_c)/D \qquad (10)$$

(f) The coefficient for under-exposure negative films can be obtained similarily but using a negative film having the aperture about [−2].

(g) The precision becomes $\sqrt{0.01^2+0.01^2}=0.014$ as the density precision should be added to the precision of the above transmittance. But it remains of [−3] to [+3] in aperture.

(3) Slope Matrix

Under the aforementioned conditions, a relation is obtained so that if colors are matched to the extent visually identical on the CRT, the result in prints would also be identical. However, for under-exposed or over-exposed negative films, visual inspection on the CRT cannot always foresee the result in prints. It would therefore facilitate inspection on the CRT if a device equivalent to a slope control device used for automatic printers. It could be determined either by using a sloped negative film or by determining empirically from various results in practice.

(I) A sloped negative film like FIG. 12 is prepared.

(II) It is inspected by the negative inspection device to obtain the optimum judgement result.

(III) The same negative film is printed to obtain an optimum printing time.

(IV) A matrix coefficient is determined from the relation between (II) and (III) described above.

(V) A large number of commercial negative films are judged by the inspection system and printed and the result thereof is analyzed to directly correct the matrix coefficient.

(4) Density Shift by Individual Preference

It would not be practical to directly take into account the particular difference by preference of individual laboratories when the negative films are inspected. It is desirable to correct on the basis of channel data of each laboratory within the inspection system. The difference by preference could be corrected almost satisfactorily by shifting the density. The amount to be shifted can be empirically obtained. Such coefficient should be directly set.

Although exposure amount is corrected by time in the above embodiment, it may be corrected by controlling the amount of light.

As described in the foregoing, since the corresponding relation between a film inspection system and a photographic printer is determined in advance so as to correct the result of inspection in this invention, it becomes possible to print the negative original images which have been inspected by the film inspection system into optimal images using a printer.

It should be understood that many modifications and adaptations of the invention will become apparent to those skilled in the art and it is intended to encompass such obvious modifications and changes in the scope of the claims appended hereto.

What is claimed is:

1. A color film inspection system comprising an image pickup device which picks up color original images to be inspected, an input light amount control device which controls the amount of input light to said image pickup device for said color original images, a converting means which converts video signals from said image pickup device into ditial values and then into density signals, a color correction circuit corrects in color the output from said converting means, a gradation converting means which independently converts in gradation the three primary color signals from said color circuit, and a color monitor means which converts the outputs of said gradation converting means into analog values and displays the same, whereby the luminance of the images displayed on said color monitor means is adjusted by the amount of input light, and the color balance is adjusted by the shift of a data table of said gradation converting means, said adjustments being conducted independently of and separately from each other.

2. A color film inspection system as claimed in claim 1, wherein said input light amount control means includes a light control unit.

3. A color film inspection system as claimed in claim 2, wherein said color original images are placed on a mirror box so that the light transmitting through said light control unit illuminates said color original images via the mirror box.

4. A color film inspection system as claimed in claim 1, wherein said converting means comprises an A/D converter and a logritmic converting circuit.

5. A color film inspection system as claimed in claim 1, wherein said pickup device is a TV camera and said color monitor means is a CRT.

6. A color film inspection system comprising a TV camera which picks up images of color original images to be inspected, a light control unit which controls the amount of light emitted from a light source upon the color original images for said TV camera, a logartihmic converting circuit which converts video signals from said TV camera into digital values and then into density signals, a color correction circuit which corrects in color said density signals, a look-up table which independently converts in gradation three primary color signals from said color correction circuit, a color monitor means which converts the output from said look-up table into analog values and displays the same, and a controlling means which controls the amount of light at said light source, the aperture of said light control unit, the magnification of said TV camera, said logarithmic converting circuit, said color correction circuit and said look-up table respectively.

7. A color film inspection system as claimed in claim 6, wherein said control means includes a keyboard and a data output device.

8. A color film inspection system as claimed in claim 7, wherein said data output device records the data on a magnetic disc.

9. A data output method for a color film inspection system which displays color film original images on a display unit of the film inspection system, evaluates and inspects the displayed images, converts the inspection data of said color film original images into exposure of the three colors of RGB of a photographic color printer and outputs the same, which is characterized in that the method comprises the steps of obtaining the amount as said inspection data which does not depend on the photographic color printer, and correcting the filtering amount of said photographic color printer which can be induced there with the transmittance of a filter which is sensed by each color sensitive layer of a color paper for printing so that said inspected film original images are printed optimally by said photographic color printer.

10. A data output method for color film inspection as claimed in claim 9, wherein said filter is a cut filter.

11. A data output method for color film inspection as claimed in claim 10, wherein the spectral characteristic of said cut filter is measured, and the result is multiplied with the spectral characteristic of said color paper to obtain the transmittance of said cut filter.

12. A data output method for color film inspection as claimed in claim 10, wherein several combinations of printing time and printing density are measured and the transmittance of said cut filter is obtained based upon the above measured values.

13. A data output method in a color film inspection system which displays color film original images on a display unit, evaluates and inspects the displayed images, converts inspected data of said color film original images into exposure amounts of three colors of RGB of a photographic color printer and outputs the same, which comprises the steps of:
    correcting sensitivity of a color paper to be printed for the inspected data which is caused by the reciprocity law failure in accordance with the degree of standard, over- or under-exposure of the color film original images; and
    optimally printing said inspected color film original images by said photographic color printer.

14. A data output method in a color film inspection system as claimed in claim 13, further including the steps of measuring a relation between a printing time and a printing density by changing the amount of light received on said color paper and correcting the sensitivity of the color paper based upon said measured relation.

15. A data output method in a color film inspection system which displays color film original images on a display unit, evaluates and inspects the displayed images and converts inspected data of said color film original images into exposure amounts of three colors of RGB of anarbitrary photographic color printer and outputs the same, which comprises the steps of:
correcting color slope characteristics of said color film inspection system in accordance with the degree of standard, over- or under-exposure of said color film original images; and optimally printing said inspected color film original images by said photographic color printer.

16. A data output method in a color film inspection system as claimed in claim 15, further including the steps of preparing a sloped negative film, obtaining an optimum inspection result, of said sloped negative film; printing said sloped negative film, obtaining an optimum ptinting time, and determining and correcting matrix coefficients of said color slope characteristics in accordance with the above relations.

17. A data output method in a color film inspection system as claimed in claim 15, further including the steps of inspecting a large number of commercial negative films by the color film inspection system, printing said commercial negative films, analyzing tendency of the printed films and determining matrix coefficients of the color slope characteristics for correction.

18. A data output method in a color film inspection system which displays color film original images on a display unit, evaluates and inspects the displayed images and converts inspected data of said color film original images into exposure amounts of three colors of RGB of an arbitrary photographic color printer and outputs the same, which comprises the steps of;
obtaining a value as said inspected data which does not depend on a photographic color printer;
correcting filtering amount of said photographic color printer which is predetermined by said value with transmission factor of a filter sensed by each color sensitive layer of a color paper to be printed; and
correcting color slope characteristics of the color film inspection system as well as sensitivity due to reciprocity law failure on said color paper in correspondence to the degree of standard, over- or under-exposure of said color film original images;
thereby to optimally print said inspected film original images by said photographic color printer.

* * * * *